Figure 9:
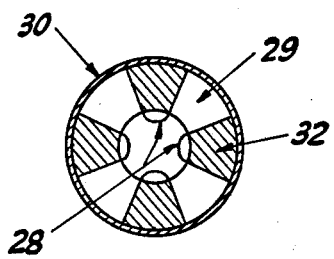

May 26, 1964     H. A. SMITH     3,134,832
METHOD FOR PRODUCING EXTRUDED ARTICLES
Original Filed June 5, 1959     2 Sheets-Sheet 1
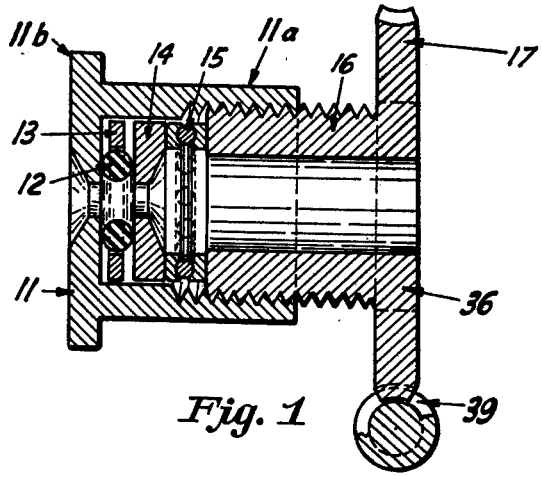
Fig. 1
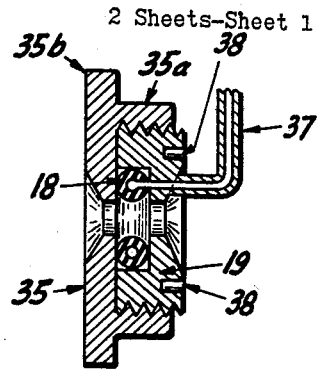
Fig. 2
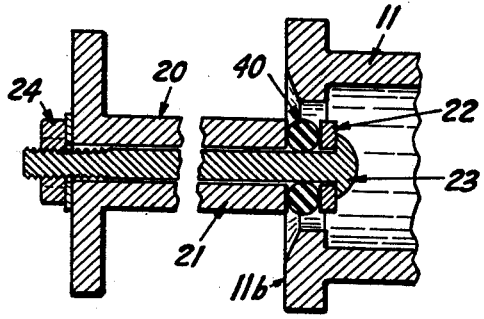
Fig. 3
Fig. 4
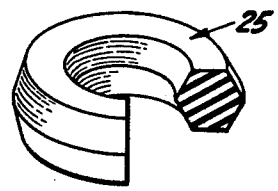
Fig. 7    Fig. 8
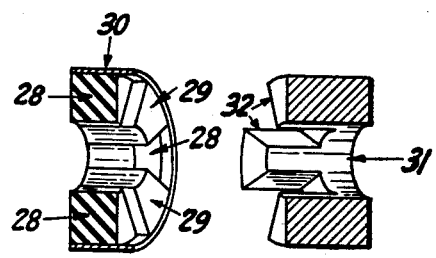
Fig. 6
Fig. 5
INVENTOR.
HOLLAND A. SMITH
BY Robert F. Fleming Jr.
ATTORNEY May 26, 1964

H. A. SMITH 3,134,832

METHOD FOR PRODUCING EXTRUDED ARTICLES

Original Filed June 5, 1959

2 Sheets-Sheet 2

INVENTOR.
HOLLAND A. SMITH
BY Robert F. Fleming Jr.

ATTORNEY

United States Patent Office 3,134,832
Patented May 26, 1964

3,134,832
METHOD FOR PRODUCING EXTRUDED ARTICLES
Holland A. Smith, Midland, Mich., assignor to Dow Corning Corporation, Midland, Mich., a corporation of Michigan
Continuation of application Ser. No. 818,274, June 5, 1959. This application Feb. 16, 1962, Ser. No. 177,691
4 Claims. (Cl. 264—167)

This invention relates to a method for producing extruded articles. This application is a continuation of my copending application, Serial No. 818,274, entitled "Variable Extrusion Dies," filed June 5, 1959, and now abandoned.

In this application the term "die" refers to any shaping device employed as a part of an extrusion apparatus. This term includes both devices shaping the outside of solid extruded articles or articles coated by extrusion and devices shaping both the inside and outside of extruded articles such as tubing. The terms "constrictive" as applied to a die part or "constriction" refer to that part of a die which shapes a feed material during extrusion.

The complexity of the conditions involved, particularly the indefinite relationship between the shape and size of the die constriction and the shape and size of the extruded article, has made it impossible to analyze extrusion by any accurate mathematical treatment. This is true because for most extrusions the size of an extruded article differs from the size of the die constriction. The degree of difference depends on the characteristics of the material extruded and on the conditions of extrusion. Accordingly, the design of extrusion dies is more an art than a science and, therefore, a matter of trial and error.

Extrusion dies generally comprise a constriction made of some rigid material such as metal, preferably steel. Consequently, for each size of article produced a special die with a specifically sized constriction is necessary. For each feed material a further change in constriction size, therefore a die change, may be necessary because of varying amounts of expansion in the feed material following extrusion. Thus, any manufacturer producing a multitude of extruded products of various sizes and materials must have a large number of dies on hand.

The primary object of this invention is to provide a method for varying the shape of extruded articles without having to change extrusion dies. Another object is to provide a method for varying the shape of extruded articles during extrusion without having to remove the extrusion die. Other objects and advantages of this invention will become apparent as the invention is explained.

These objects are obtained by a method for producing extruded articles which comprises extruding a feed material through the extrusion aperture of a variable constriction which is composed at least in part of an elastomeric material, the extruded article being shaped by said constriction, the shape of the extruded article being altered by exerting pressure upon the elastomeric material in order to deform said elastomeric material, whereby the extrusion aperture is altered resulting in an alteration in the shape of the extruded article.

The preferred extrusion dies used to achieve this method are shown in FIGURES 1, 2, 3 and 10 which are axial longitudinal sections of extrusion dies. FIGURE 4 is a fragmentary view of an alternative die constriction which can be used to achieve the method of this invention. FIGURE 5 is a view of an elastomeric die constriction deformed by a retaining spacer. FIGURE 6 is an axial longitudinal section of an inflatable mandrel. FIGURE 7 is a view of a die constriction composed of alternating metal and rubber segments, said die being sectioned longitudinally and axially. FIGURE 8 is a view of an insert sectioned axially and longitudinally and designed to conform to the configuration of the rubber segments in the die constriction of FIGURE 7. FIGURE 9 is a transverse section of the combination of the die constriction in FIGURE 7 with the insert in FIGURE 8 under compression, said section being taken at the right end of the die at the surfaces 29 as depicted in FIGURE 7. FIGURE 11 is an end elevation of the embodiment of FIGURE 1.

The extrusion die shown in FIGURE 1 includes an extrusion die body 11 composed of a cylindrical sleeve 11a internally threaded from one end, the other end being integral with a circular plate 11b forming a peripheral flange by which the body 11 can be secured in conventional extrusion apparatus. Axially through the plate 11b there is a circular hole having a diameter only slightly larger than the diameter of the desired extrusion aperture as defined by the constrictive annulus described below. The edges of the plate around the hole can be beveled if desired. In the body 11 adjacent to the plate 11b is an elastomeric constrictive annulus 12 which defines the extrusion aperture. The annulus 12 is centered axially within the sleeve 11a by a rigid spacer 13, the outside diameter of which is essentially the same as the inside diameter of the sleeve 11a. The spacer thickness is less than that of the annulus 12, and the diameter of the spacer hole is the same or only slightly larger than the outside diameter of the annulus 12. The annulus 12 centered by the spacer 13 is held against the plate 11b by a ring 14, consisting of a rigid flat circular plate the outside diameter of which is essentially the same as the inside diameter of the sleeve 11a and axially through the center of which there is a circular hole the diameter of which is only slightly larger than the diameter of the hole in the annulus 12. The edge of the ring 14 around the hole and adjacent to the annulus 12 is preferably square. The edge of the ring around the hole and away from the annulus 12 can be beveled if desired. The ring 14 is held in place by an end thrust ring bearing 15 axially centered within the sleeve 11a and having a hole therethrough with a diameter substantially greater than the diameter of the aperture in ring 14. A follower 36 consists of a boss 16 threaded to mate with sleeve 11a and a worm gear 17 integral and coaxial with boss 16. With follower 36 in operative position boss 16 bears against bearing 15. The gear 17 is controlled by a worm 39. However, a handle can be attached to the gear 17 when it is disengaged from the worm 39 for direct manual rotation of follower 36.

As shown in FIGURE 11, there is a hole, preferably circular, axially through the gear 17 of sufficient diameter to allow unobstructed passage of the extruded article. The gear 17 is engaged with the worm 39 which is supported by two rotary bearings 27. The worm 39 can be turned continuously in one direction by some drive means or can be reversed by any standard mechanical trip. A pointer 41 can be attached to the worm gear related to a calibrated dial 42.

In FIGURE 1 as the gear 17 is turned by the worm 39 the boss 16 of the follower 36 is screwed into the sleeve 11a. The boss 16 presses through the bearing 15 and the ring 14 against the annulus 12. The annulus 12 being confined by the body 11, the spacer 13 and the ring 14 can only expand inwardly under this compressive force thereby uniformly reducing the size of the hole in the annulus, i.e. the extrusion aperture. The annulus 12 can be hollow to increase flexibility if desired.

The extrusion die shown in FIGURE 2 includes an extrusion die body 35, comparable to body 11 in FIGURE 1, composed of a cylindrical internally threaded sleeve 35a integral with a circular plate 35b forming a peripheral flange by which the body 35 can be secured in conventional extrusion apparatus. Axially through the center of the plate 35b there is a circular hole having a diameter only slightly larger than the diameter of the desired extrusion aperture as defined by an inflatable elastomeric constrictive annulus 18 which is inside the body 35. The annulus 18 is centered axially within the sleeve 35b and held against the plate 35a by a rigid cylindrical follower 19 threaded to mate with the internal threads of the sleeve 35a. In the center of one end of the follower 19, there is a circular recess of sufficient size to hold the annulus 18. Axially through the follower there is a circular hole of slightly larger diameter than the diameter of the hole in the annulus 18. The inflation inlet of the annulus 18 is connected to a fluid feed line 37 passing through the follower 19. The follower 19 also has two spanner reams 38.

In FIGURE 2 as a fluid, i.e. gas or liquid, is forced through line 37 into the annulus 18 confined by the follower 19 and the body 35, the annulus 18 expands in the only free direction, i.e. inwardly, thereby uniformly reducing the extrusion aperture.

The extrusion die shown in FIGURE 3 includes a body 11 as described in FIGURE 1 wherein the edge of the plate 11b around the hole therethrough acts as a constriction in the die. Positioned axially within the hole of the plate 11b is a mandrel 20 made up of a rigid cylinder 21 through which a square hole passes axially. At the unsecured end of cylinder 21 is an elastomeric constrictive annulus 40 held in place by a washer 22 the outside diameter of which is slightly less than the outside diameter of the annulus 40. The washer is held in place by the head of a bolt 23 having a shaft, the central part of which conforms to the square hole in cylinder 21 and which passes through said hole. The end of the bolt shaft is round and threaded and held fast by a nut 24.

In FIGURE 3 tightening the nut 24 pulls the bolt 23 against the washer 22 thereby pressing the annulus 40 against the end of the cylinder 21. Since the annulus 40 is confined by the cylinder 21, the washer 22 and the bolt shaft, the annulus expands outward uniformly thereby uniformly reducing the extrusion aperture as defined by the two constrictions, the annulus 40 and the body 11.

FIGURE 4 shows an elastomeric ring-like constriction 25 of hexagonal section. This constriction 25 operates in essentially the same way as the annulus 12 employed in FIGURE 1 and the annulus 40 in FIGURE 3. This shows that the transverse sectional configuration of the die constrictions is not critical.

In FIGURE 5 the annulus 12 is distorted to an oblong shape by a rigid adapter 26 the outside diameter of which is essentially the same as the inside diameter of the die body sleeve in which the die is to be housed. The adapter thickness is less than that of the annulus 12. The adapter hole is oblong in shape and axially centered.

The annulus-adapter combination of FIGURE 5 can be substituted for the annulus-spacer combination of FIGURE 1 to produce a non-circular extruded product. An elastomeric constriction employed in this invention can be pre-shaped or forcibly shaped in any desired size or shape, e.g. square, hexagon, triangle, rectangle, circle or oval.

The mandrel shown in FIGURE 6 is an alternate for the mandrel 20 in FIGURE 3. It is made up of a rigid cylindrical tube 33 containing and supporting an elastomeric sleeve at the end of which is an inflatable elastomeric bulb 34 of greater diameter than the external diameter of the metal tube. There is a fluid passage through the elastomeric sleeve to the bulb 34.

The mandrel of FIGURE 6 can be substituted for the mandrel 20 in FIGURE 3 and is most useful where a small mandrel is needed. A fluid, i.e. gas or liquid, is pumped into the bulb 34 causing it to expand thereby reducing the size of the extrusion aperture as defined by the two constrictions, the bulb 34 and the body 11.

The die constriction depicted in FIGURE 7 is composed of four sectorial rubber segments 28 alternated with four sectorial steel segments 29 held together by a cylindrical steel collar 30. There is a round hole passing axially through the constriction.

Insert 31 in FIGURE 8 consists of a rigid cylinder having an outside diameter equal to or slightly less than the inside diameter of the collar 30 in FIGURE 7. Axially through the insert there is a hole having a diameter equal to or slightly larger than that of the hole through the constriction in FIGURE 7. The insert is cut so that four sectorial prongs 32 remain extending from the uncut portion of the cylinder. The transverse sections and spacing of these prongs 32 conform to the corresponding sections and spacing of the rubber segments 28 of the constriction in FIGURE 7.

The insert 31 of FIGURE 8 is joined with the constriction of FIGURE 7 such that the prongs 32 rest on the rubber segments 28. This combination can then be substituted in an apparatus similar to that shown in FIGURE 1 for the combination of annulus 12, spacer 13 and ring 14. When the boss 16 applies pressure through a bearing 15 to the insert 31, the prongs 32 of the insert 31 compress the rubber segments 28. Since the rubber segments 28 are confined by the steel segments 29 and collar 30, compression of the rubber segments 28 causes them to bulge inward changing the extrusion aperture from a round shape to a fluted shape as shown in FIGURE 9.

Figure 10:
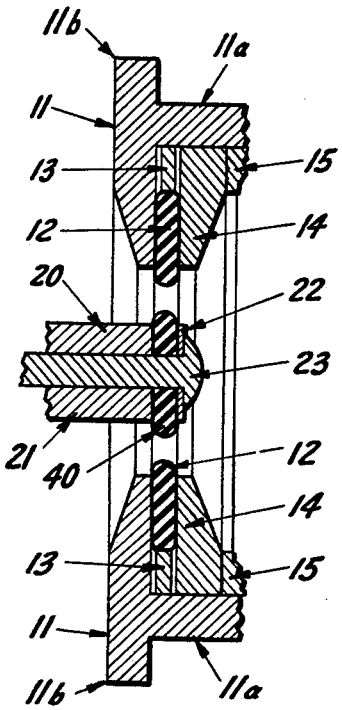
Figure 11:
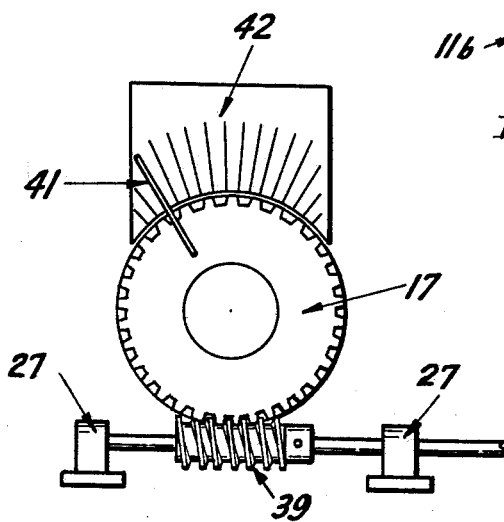

The extrusion die shown in FIGURE 10 is the embodiment shown in FIGURE 3 with a substitution of the embodiment shown in FIGURE 1 for the body 11 in FIGURE 3. This combination is intended for producing tubing of varying dimensions. The outer annulus 12 is varied as shown for the annulus 12 of FIGURE 1. The inner annulus 40 is varied as shown for the annulus 40 of FIGURE 3.

Where heating is necessary to plasticize the feed material, e.g. thermoplastic resins, heat stable silicone elastomers can be employed for the elastomeric material. Where solvents are used to plasticize the feed material, e.g. some plastics, solvent resistant elastomeric materials should be used. Where little or no heating is necessary to plasticize the feed material, organic rubbers can be used. In any case it is desirable that the elastomeric material be as tough, i.e. abrasion-resistant and non-flexible, as possible while retaining sufficient resiliency to allow manipulation of the constrictive parts for variations in the extrusion aperture.

The method of this invention can be used, for example, for producing extruded articles from such materials as rubber, organic resins, food, soaps, cosmetics, ceramics and carbon pastes. The extrusion products can be supported, e.g. coated wires or fabrics, or unsupported. They can be solid, e.g. rods, or hollow, e.g. tubing. Designs can be cut into the elastomeric material if desired.

That which is claimed is:

1. A method for producing circular extruded articles which comprises extruding a feed material through the extrusion aperture of a variable circular constriction which is composed of an elastomeric material, the circular extruded article being shaped by said circular constriction, and regulating the pressure upon the elastomeric material in order to cause the uniform deformation of said elastomeric material so that the circular extrusion aperture is uniformly altered in size resulting in a uniform alteration in the size of the circular extruded article.

2. A method for producing circular extruded articles which comprises extruding a feed material through the extrusion aperture of a variable circular constriction which is composed of a confined elastomeric material, the circular extruded article being shaped by said circular constriction, and regulating the pressure upon the confined elastomeric material in order to cause the uniform deformation of said elastomeric material so that the circular extrusion aperture is uniformly altered in size, resulting in a uniform alteration in the size of the circular extruded article.

3. A method for producing circular extruded tubing which comprises extruding a feed material through the extrusion aperture of a variable circular constriction which is composed of a confined elastomeric material, the circular extruded tubing being shaped by said circular constriction, regulating the pressure upon the confined elastomeric material in order to cause the uniform deformation of said elastomeric material so that the circular extrusion aperture is uniformly altered in size resulting in a uniform alteration in the size of the circular extruded tubing.

4. A method for producing coated wire having a circular coating which comprises extruding a feed material onto a wire through the extrusion aperture of a variable circular constriction which is composed of a confined elastomeric material, the circular coating on the wire being shaped by said circular constriction, regulating the pressure upon the confined elastomeric material in order to cause the uniform deformation of said elastomeric material so that the circular extrusion aperture is uniformly altered in size resulting in a uniform alteration in the thickness of the circular coating on the wire.

References Cited in the file of this patent

UNITED STATES PATENTS

| | | |
|---|---|---|
| 1,636,243 | Ramussen | July 19, 1927 |
| 1,808,411 | Hinkston | June 2, 1931 |
| 2,043,683 | Walters | June 9, 1936 |
| 2,044,961 | Waner | June 23, 1936 |
| 2,307,575 | Davis | Jan. 5, 1943 |
| 2,309,903 | Hume | Feb. 2, 1943 |
| 2,403,476 | Beery et al. | July 9, 1946 |
| 2,425,237 | Field | Aug. 5, 1947 |
| 2,582,922 | Crowley et al. | Jan. 15, 1952 |
| 2,712,693 | Comparette | July 12, 1955 |
| 2,763,910 | Braatelien | Sept. 25, 1956 |
| 2,780,835 | Sherman | Feb. 12, 1957 |
| 2,820,252 | Koch | Jan. 21, 1958 |